United States Patent
Jeanson et al.

(10) Patent No.: US 10,947,861 B2
(45) Date of Patent: Mar. 16, 2021

(54) VARIABLE VANE MECHANISM FOR TURBOCHARGER WITH UNISON RING AND BEARING MEMBERS HAVING INDEPENDENT MATERIAL CHARACTERISTICS

(71) Applicant: HONEYWELL INTERNATIONAL INC., Morris Plains, NJ (US)

(72) Inventors: Arthur Jeanson, Chatel sur Moselle (FR); Philippe Arnold, Hennecourt (FR)

(73) Assignee: GARRETT TRANSPORTATION I INC, Torrance, CA (US)

( * ) Notice: Subject to any disclaimer, the term of this patent is extended or adjusted under 35 U.S.C. 154(b) by 164 days.

(21) Appl. No.: 15/905,098

(22) Filed: Feb. 26, 2018

(65) Prior Publication Data

US 2019/0264605 A1  Aug. 29, 2019

(51) Int. Cl.
*F01D 17/16* (2006.01)
*F02B 37/24* (2006.01)
*F02C 9/22* (2006.01)

(52) U.S. Cl.
CPC .......... *F01D 17/165* (2013.01); *F02B 37/24* (2013.01); *F02C 9/22* (2013.01); *F05D 2220/40* (2013.01); *F05D 2230/40* (2013.01); *F05D 2230/41* (2013.01); *F05D 2230/90* (2013.01); *F05D 2250/90* (2013.01)

(58) Field of Classification Search
CPC .......... F01D 17/00; F01D 17/10; F01D 17/12; F01D 17/14; F01D 17/141; F01D 17/145; F01D 17/16; F01D 17/165; F02B 37/24
See application file for complete search history.

(56) References Cited

U.S. PATENT DOCUMENTS

| 6,623,240 | B2 | 9/2003 | Ertl et al. |
| 8,992,164 | B2 * | 3/2015 | Ramb ................ F01D 17/165 |
| | | | 415/155 |
| 2017/0016343 | A1 * | 1/2017 | Lummer .............. F01D 17/165 |
| 2017/0159555 | A1 * | 6/2017 | Reyes ..................... F02C 6/12 |

FOREIGN PATENT DOCUMENTS

| DE | 102008020732 A1 | 11/2009 |
| EP | 1227221 A2 | 7/2002 |
| EP | 1965037 A1 | 9/2008 |
| EP | 2320033 A2 | 5/2011 |
| EP | 2592239 A2 | 5/2013 |

OTHER PUBLICATIONS

English Translation of DE102008020732 (Year: 2008).*
European Patent Office, European Extended Search Report for Application No. 19157334.4 dated Apr. 15, 2019.

* cited by examiner

*Primary Examiner* — Eldon T Brockman
*Assistant Examiner* — Michael K. Reitz
(74) *Attorney, Agent, or Firm* — Lorenz & Kopf, LLP

(57) ABSTRACT

A turbocharger includes a variable vane mechanism includes a unison ring and at least one bearing member that is fixed to the unison ring. The bearing member includes a bearing surface that supports rotation of the unison ring within the variable vane mechanism. The unison ring and the at least one bearing member have independent material characteristics.

20 Claims, 9 Drawing Sheets

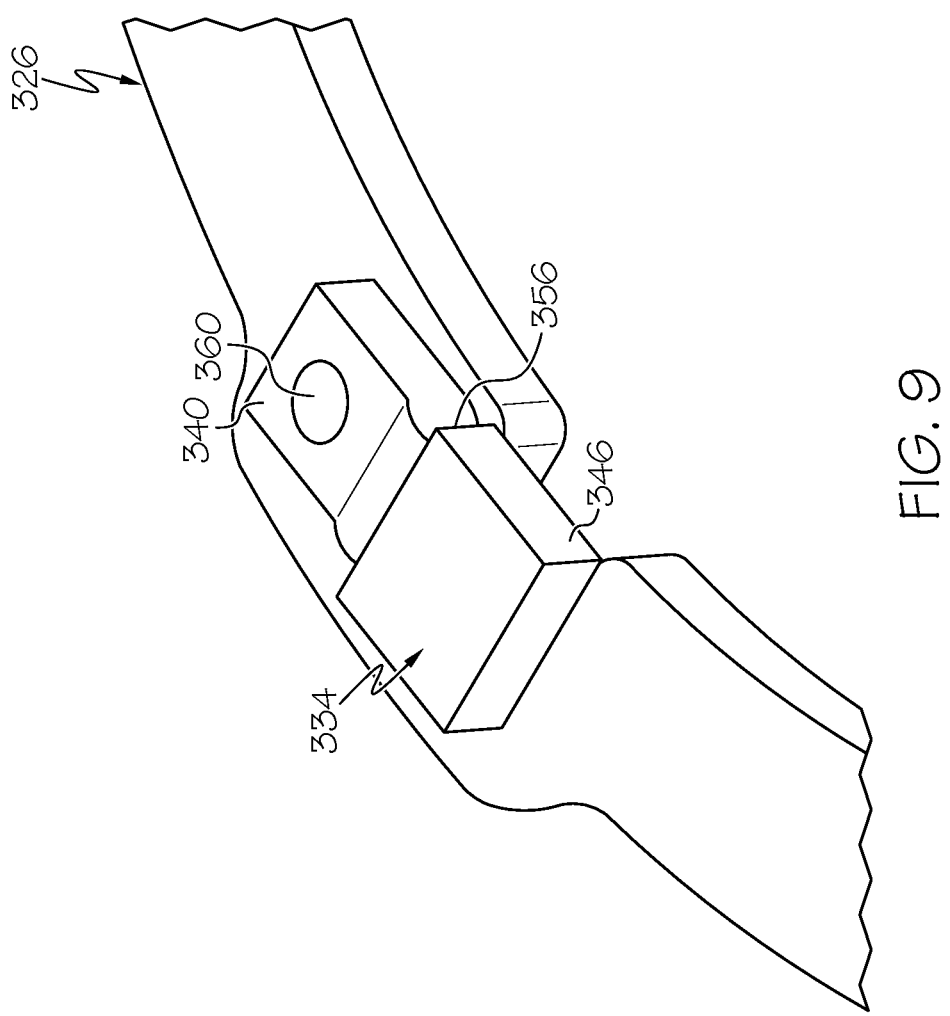

VARIABLE VANE MECHANISM FOR TURBOCHARGER WITH UNISON RING AND BEARING MEMBERS HAVING INDEPENDENT MATERIAL CHARACTERISTICS

TECHNICAL FIELD

The present disclosure generally relates to a variable vane mechanism for a turbocharger and, more particularly, relates to a variable vane mechanism with a unison ring and one or more bearing members that have independent material characteristics.

BACKGROUND

Some vehicles include a turbocharger, supercharger and/or other devices for boosting the performance of an internal combustion engine. More specifically, these devices can increase the engine's efficiency and power output by forcing extra air into the combustion chamber of the engine.

In some cases, a turbocharger system may include a variable vane mechanism, which is often referred-to as a cartridge (cartridge structure, cartridge assembly, etc.). The mechanism may be included on a turbine section. It may include a plurality of vanes that move to change air pressure parameters in the supply to a turbine wheel. The vanes may be moved, for example, according to the operating speed of the engine.

The variable vane mechanism may be relatively complicated and may present manufacturing challenges. Forming certain parts may be difficult. Many mechanisms include a relatively high number of parts. Assembly of these parts may be complicated as well. The unison ring, for example, presents particular manufacturing challenges and attaching the vanes to the unison ring can be highly complicated.

Thus, it is desirable to provide a turbocharger system that provides manufacturing efficiencies and that improves manufacturability. It is desirable to provide a variable vane mechanism for a turbocharger with fewer parts, that is simpler to assemble, and/or that reduces part cost compared to conventional turbocharger systems. Other desirable features and characteristics of the present disclosure will become apparent from the subsequent detailed description and the appended claims, taken in conjunction with the accompanying drawings and this background discussion.

BRIEF SUMMARY

In one embodiment, a turbocharger system is disclosed that includes a housing and a wheel configured to rotate within the housing. The turbocharger system includes a variable vane mechanism configured to move between a first position and a second position to affect a gas stream relative to the wheel. The variable vane mechanism includes a support ring with a first bearing surface. The first bearing surface is arcuate. The variable vane mechanism also includes a unison ring that is supported for rotation relative to the support ring as the variable vane mechanism moves between the first position and the second position. Moreover, the variable vane mechanism includes a plurality of vanes that are operatively connected to the unison ring and configured to move substantially synchronously relative to the support ring as the unison ring rotates relative to the support ring to affect the gas stream. Furthermore, the variable vane mechanism includes at least one bearing member that is fixed to the unison ring and that includes a second bearing surface. The second bearing surface abuts the first bearing surface and is supported for sliding movement on the first bearing surface to support rotation of the unison ring relative to the support ring. The unison ring and the at least one bearing member have independent material characteristics.

In addition, a method of manufacturing a variable vane mechanism of a turbocharger is disclosed. The variable vane mechanism is configured to move between a first position and a second position to affect a gas stream relative to a wheel of the turbocharger. The method includes heat treating a unison ring of the variable vane mechanism to add a heat treat coating to the unison ring. The method also includes attaching the heat treated unison ring with an affixed bearing member to a support ring including abutting a first bearing surface of the support ring and a second bearing surface of the bearing member. The first bearing surface is annular and configured to support sliding movement of the second bearing surface on the first bearing surface. The unison ring is supported for rotation relative to the support ring as the variable vane mechanism moves between the first position and the second position to substantially synchronously move a plurality of vanes of the variable vane mechanism. The first bearing surface and the second bearing surface are free of the heat treat coating.

In an additional embodiment, a turbocharger system is disclosed. The turbocharger system includes a turbine housing and a turbine wheel configured to rotate within the housing. The turbocharger system also includes a variable vane cartridge mechanism configured to move between a first position and a second position to affect an exhaust gas stream supplied to the turbine wheel. The variable vane cartridge mechanism includes a support ring with an annular groove defined by a first bearing surface. The variable vane cartridge mechanism further includes a unison ring that is supported for rotation about an axis of rotation relative to the support ring as the variable vane cartridge mechanism moves between the first position and the second position. The variable vane cartridge mechanism also includes a plurality of arms, each with a first end that is moveably attached to the unison ring and a second end that is opposite the first end. The variable vane cartridge mechanism includes a plurality of vanes that are operatively connected to the second end of corresponding ones of the plurality of arms. The plurality of vanes and the plurality of arms are configured to move substantially synchronously relative to the support ring as the unison ring rotates relative to the support ring about the axis of rotation. Moreover, the variable vane cartridge mechanism includes at least three bearing members that are fixed to the unison ring and that are spaced substantially equally about the axis of rotation. Each of the bearing members includes a second bearing surface that abuts the first bearing surface and that is supported for sliding movement on the first bearing surface to support rotation of the unison ring relative to the support ring. The unison ring and the plurality of arms are coated with a heat treat nitride coating. The first bearing surface and the second bearing surface are free of the heat treat nitride coating.

BRIEF DESCRIPTION OF THE DRAWINGS

The present disclosure will hereinafter be described in conjunction with the following drawing figures, wherein like numerals denote like elements, and wherein:

FIG. 9 is a perspective view of the unison ring and bearing members according to additional example embodiments of the present disclosure.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a turbocharger with a variable vane mechanism (cartridge, cartridge structure, cartridge assembly, etc.). The variable vane mechanism may include certain features that improve manufacturability. Different parts of the assembly may be constructed from different materials. Likewise, different parts may include different coatings. In other words, the different parts or portions of the mechanism may have independent material characteristics.

In some embodiments, the unison ring of the variable vane mechanism may be heat-treated to produce a coating, such as nitride. Other attached parts may be nitrided as well to increase the part strength. Meanwhile, the unison ring may include fixedly attached bearing members (insert members). The bearing members may be slidingly engaged with an opposing bearing surface (e.g., on a support ring or nozzle ring) of the variable vane mechanism. The bearing members may be constructed from a different material and/or may be free of the nitride coating on the unison ring. As such, the material characteristics of the bearing members may be chosen to correspond to the opposing bearing surface for low-friction and low-wear rotation of the unison ring and the vanes. Accordingly, the variable vane mechanism of the present disclosure may provide manufacturing efficiencies.

Figure 1:
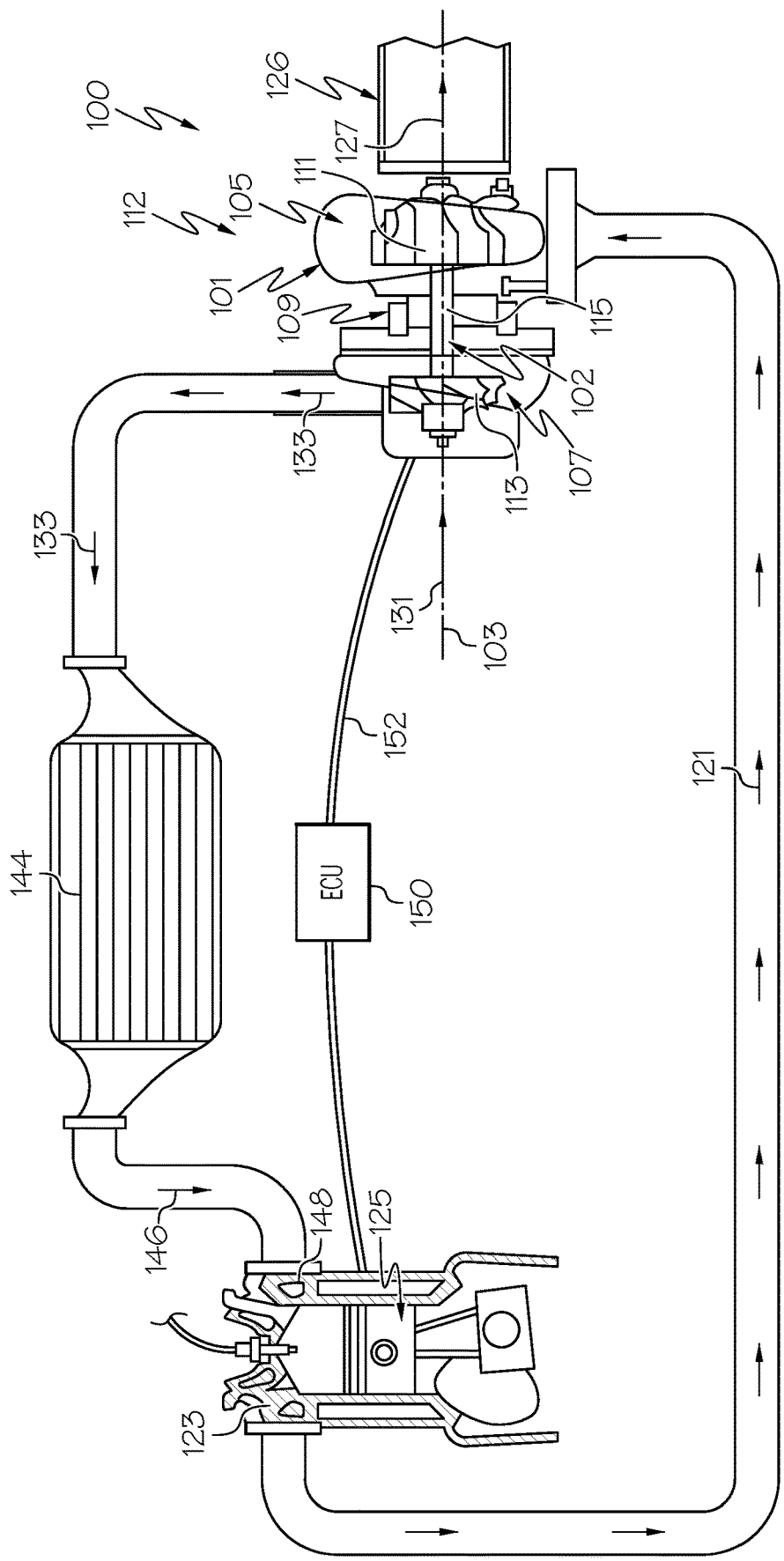
FIG. 1 is a schematic view of a vehicle engine system, which includes a turbocharger according to example embodiments of the present disclosure.

FIG. 1 is a schematic view of an example turbocharger system 100 that includes a turbocharger 112. The turbocharger 112 generally includes a turbocharger housing 101 and a rotor 102. The rotor 102 is configured to rotate within the turbocharger housing 101 about an axis of rotor rotation 103. The rotor 102 may be supported for rotation about the axis 103 via one or more bearings (not shown). In some embodiments, the rotor 102 may be rotationally supported by thrust bearings and a plurality of journal bearings. Alternatively, other bearings may be included.

As shown in the illustrated embodiment, the turbocharger housing 101 may include a turbine housing 105, a compressor housing 107, and a bearing housing 109. The bearing housing 109 may be disposed between the turbine and compressor housings 105, 107. Also, in some embodiments, the bearing housing 109 may contain the bearings of the rotor 102.

Additionally, the rotor 102 includes a turbine wheel 111, a compressor wheel 113, and a shaft 115. The turbine wheel 111 is located substantially within the turbine housing 105. The compressor wheel 113 is located substantially within the compressor housing 107. The shaft 115 extends along the axis of rotation 103, through the bearing housing 109, to connect the turbine wheel 111 to the compressor wheel 113. Accordingly, the turbine wheel 111 and the compressor wheel 113 rotate together about the axis 103.

The turbine housing 105 and the turbine wheel 111 cooperate to form a turbine (i.e., turbine section, turbine stage) configured to circumferentially receive a high-pressure and high-temperature exhaust gas stream 121 from an engine, e.g., from an exhaust manifold 123 of an internal combustion engine 125. The turbine wheel 111 (and thus the rotor 102) is driven in rotation around the axis 103 by the high-pressure and high-temperature exhaust gas stream 121, which becomes a lower-pressure and lower-temperature exhaust gas stream 127 that is released into a downstream exhaust pipe 126. In other embodiments, the engine 125 may be of another type, such as a diesel fueled engine.

The compressor housing 107 and compressor wheel 113 form a compressor (i.e., compressor section, compressor stage). The compressor wheel 113, being driven in rotation by the exhaust-gas driven turbine wheel 111, is configured to compress received input air 131 (e.g., ambient air, or already-pressurized air from a previous-stage in a multistage compressor) into a pressurized air stream 133 that is ejected circumferentially from the compressor housing 107. The compressor housing 107 may have a shape (e.g., a volute shape or otherwise) configured to direct and pressurize the air blown from the compressor wheel 113. Due to the compression process, the pressurized air stream 133 is characterized by an increased temperature, over that of the input air 131.

The pressurized airstream 133 may be channeled through an air cooler 144 (i.e., intercooler), such as a convectively cooled charge air cooler. The air cooler 144 may be configured to dissipate heat from the pressurized air stream 133, increasing its density. The resulting cooled and pressurized output air stream 146 is channeled into an intake manifold 148 of the internal combustion engine 125, or alternatively, into a subsequent-stage, in-series compressor. The operation of the system 100 may be controlled by an ECU 150 (engine control unit) that connects to the remainder of the system via communication connections 152.

Figure 2:
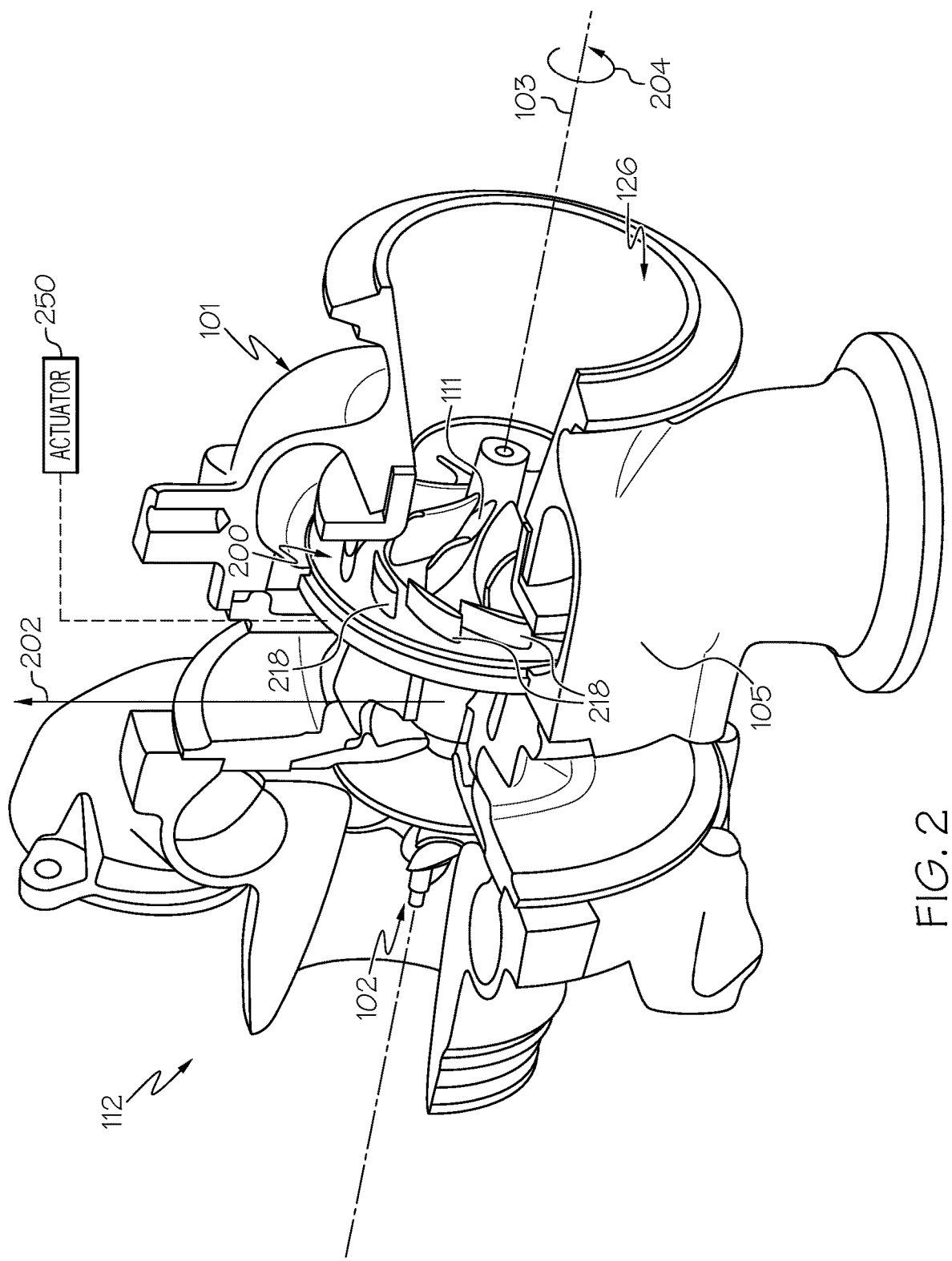
FIG. 2 is a perspective view of the turbocharger of FIG. 1 with some features hidden to show a variable vane mechanism according to example embodiments of the present disclosure.

Referring now to FIG. 2, additional details of the turbocharger 112 will be discussed according to example embodiments. Portions of the turbocharger housing 101 and other portions are omitted for clarity. Elements of a radial coordinate system are also shown for reference, such as the axis of rotation 103 of the rotor 102, a representative radial axis 202, and an arrow 204 that represents the circumferential direction extending about the axis 103.

As shown, the turbocharger 112 may include a variable vane mechanism 200. (i.e., a cartridge, cartridge assembly, etc.). The variable vane mechanism 200 may include a plurality of vanes 218 and various supporting structures that will be discussed in detail below. Generally, the variable vane mechanism 200 may move between a first position and a second position to affect the exhaust gas stream 121 flowing within the turbocharger housing 105 toward the turbine wheel 111. Specifically, the plurality of vanes 218 may move (e.g., rotate) substantially synchronously to affect the gas stream 121. Accordingly, the vanes 218 may move to selectively change the pressure parameters of the gas stream 121 as it is delivered to the turbine wheel 111. The vanes 218 may be moved, for example, according to the speed of the engine 125 to maintain high efficiency of the turbocharger 112.

Figure 3:
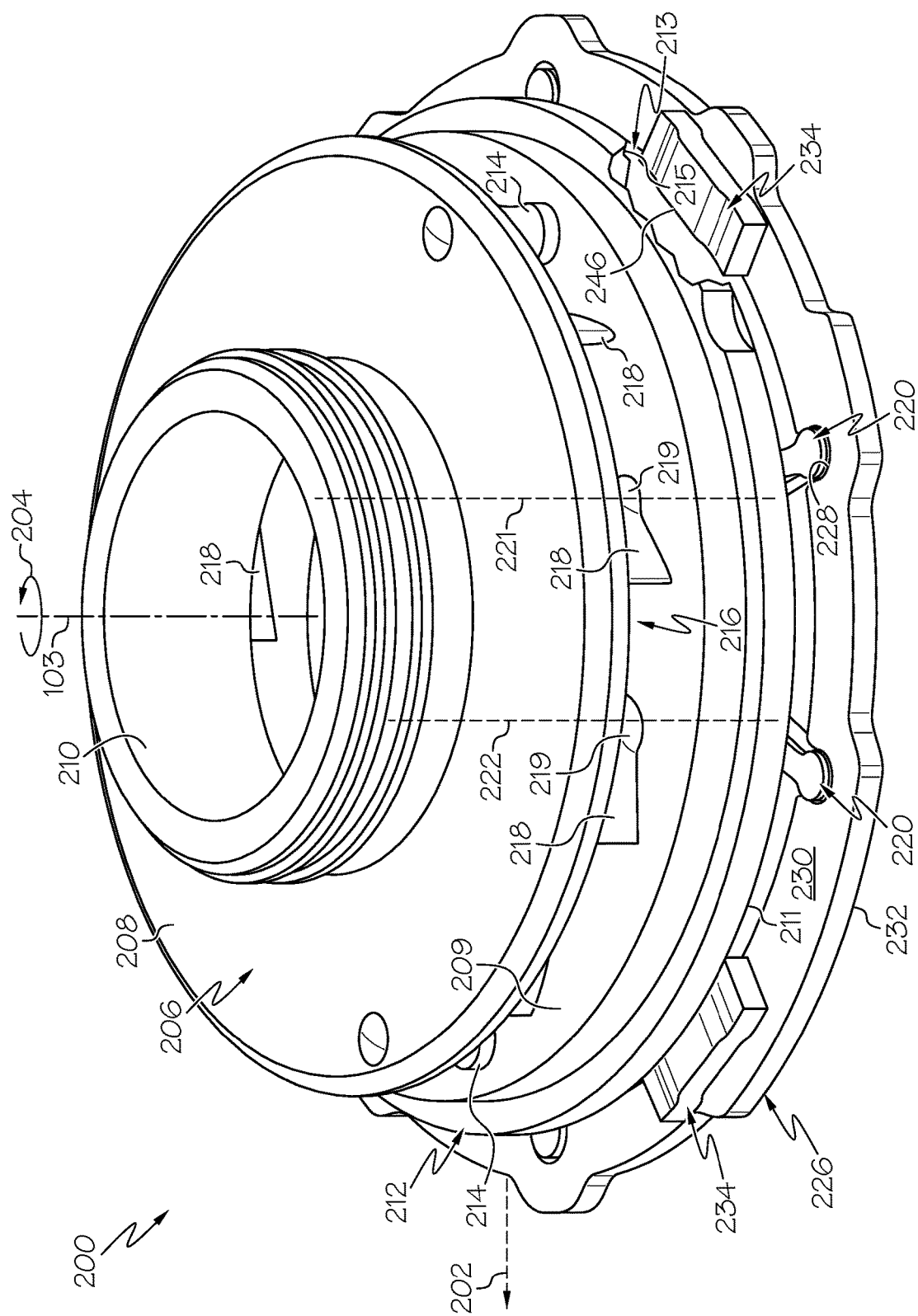
FIG. 3 is a perspective view of the variable vane mechanism of FIG. 2.

The variable vane mechanism 200 is shown in FIG. 3 according to example embodiments. As shown, the mechanism 200 may include a pipe 206. The pipe 206 may be a rigid, disc-like component with an annular portion 208 and a central opening 210. The central opening 210 may be substantially centered on the axis 103. The turbine wheel 111 may be at least partially received within the central opening 210.

The variable vane mechanism 200 may further include a support ring 212 (i.e., nozzle ring). The support ring 212 may be rigid and disc-like. The support ring 212 may be substantially centered on the axis 103. The support ring 212 may include a first face 209 and a second face 211. The first face 209 may face the annular portion 208 of the pipe 206. The second face 211 may face in an opposite direction, away from the pipe 206.

The variable vane mechanism 200 may additionally include a plurality of spacers 214. The spacers 214 may be rods, posts, or other similar structures that are attached at one end to the pipe 206 and the opposite end to the support ring 212 to maintain a predetermined space 216 between the pipe 206 and the first face 209 of the support ring 212.

As shown, the plurality of vanes 218 may be supported for movement within the space 216. The vanes 218 may be spaced apart from each other in the circumferential direction 204. Each vane 218 may have an air-foil shape and may include a mounted end 219. The mounted end 219 may be attached to a post 217, which extends through the support ring 212, substantially parallel to the axis 103. The post 217 may support the vane 218 for rotation about an individual axis of rotation 221. Accordingly, the vane 218 may move to selectively affect the exhaust gas stream 121.

Figure 4:
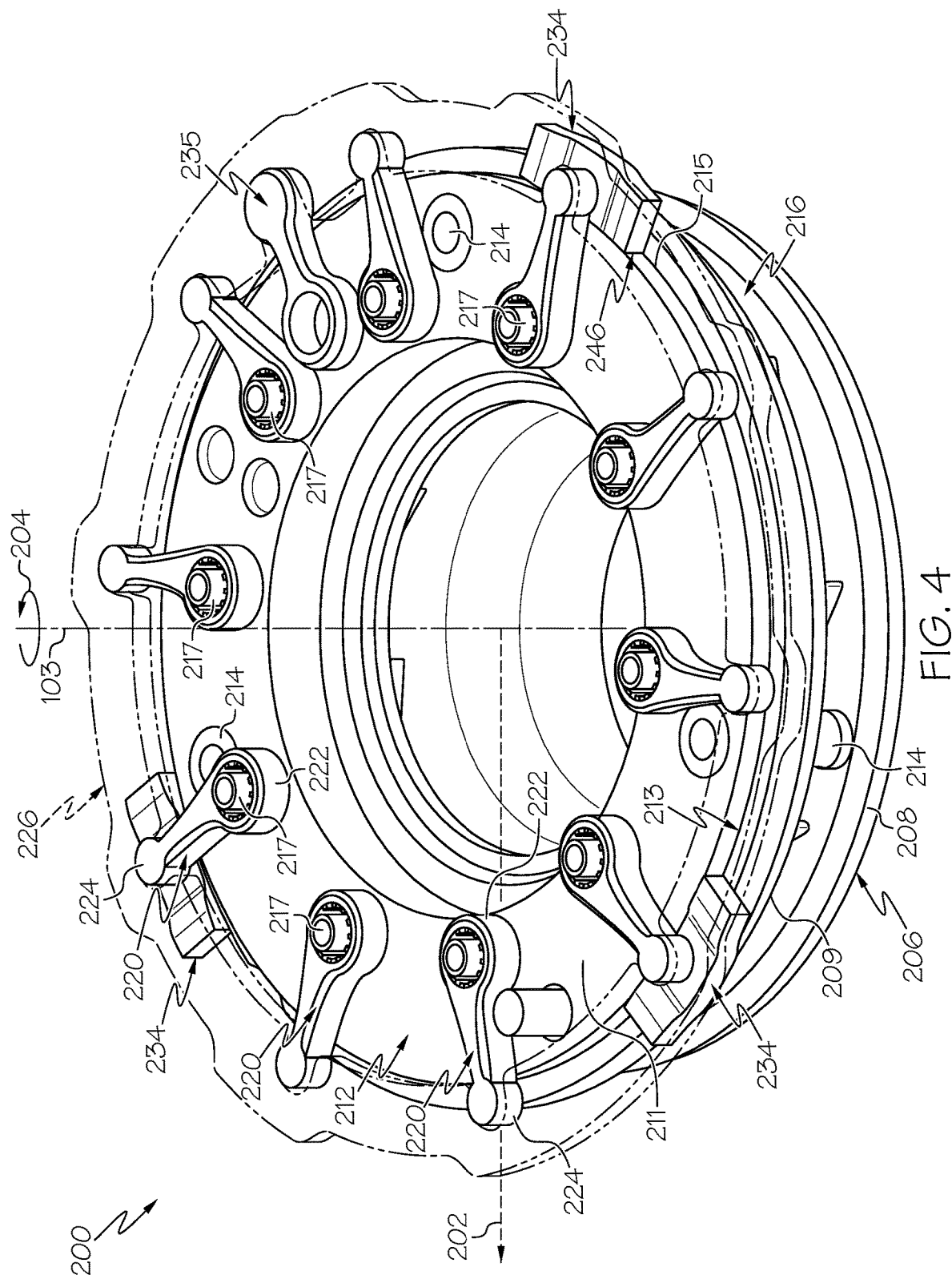
FIG. 4 is an inverted perspective view of the variable vane mechanism of FIG. 3, wherein a unison ring of the variable vane mechanism is shown in phantom.

As shown in FIG. 4, the variable vane mechanism 200 may also include a plurality of arms 220. The arms 220 may be elongate and may include a first end 222 and a second end 224. The arms 220 may extend across the second face 211 of the support ring 212. The first end 222 may be operatively attached to an end of the post 217 that is exposed from the second face 211. The second end 224 of the arm 220 may extend radially outward from the support ring 212 and may extend radially beyond the edge of the support ring 212.

Figure 5:
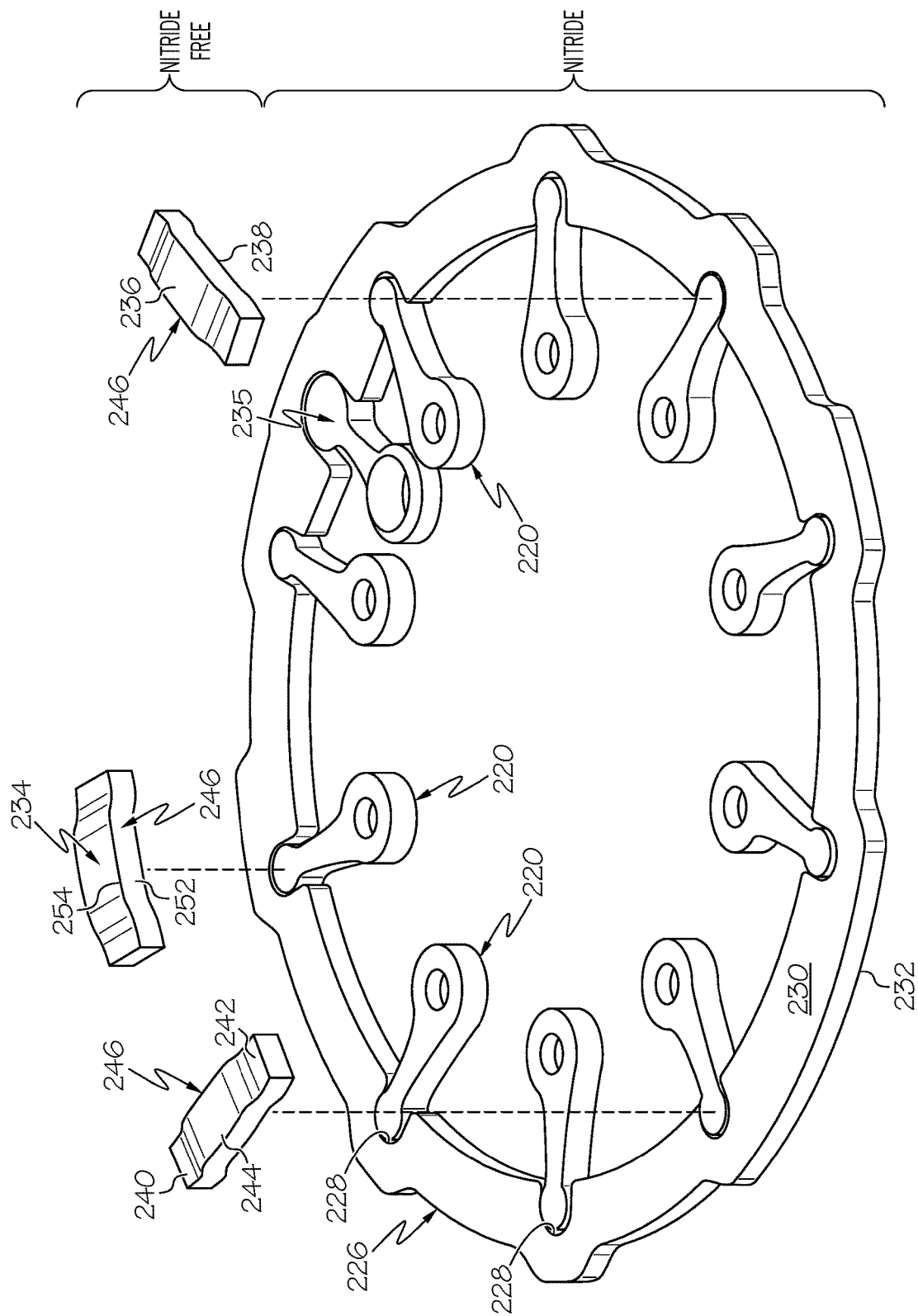
FIG. 5 is an exploded perspective view of the unison ring, arms, and bearing members of the variable vane mechanism of FIG. 3.

The variable vane mechanism 200 may further include a unison ring 226. The unison ring is shown in FIGS. 3 and 5, and is shown in phantom in FIG. 4. The unison ring 226 may be rigid, annular, flat, and relatively thin. The unison ring 226 may include a first surface 230 and a second surface 232. The first surface 230 may face along the axis 103 in the same direction as the first face 209 of the support ring 212. The second surface 232 may face in the opposite direction. The unison ring 226 may further include a plurality of inner diameter notches 228. The notches 228 receive corresponding second ends 224 of the arms 220 to interconnect the unison ring 226 and the plurality of arms 220.

The unison ring 226 may be supported for rotation about the axis of rotation 103 relative to the support ring 212. The arms 220 (being received in the notches 228 of the unison ring 226), and the posts 217 may operatively connect corresponding ones of the vanes 218 to the unison ring 226. The arms 220 may rotate substantially synchronously with the ring 226, causing the posts 217 to rotate. As a result, the vanes 218 substantially synchronously rotate within the space 216 about the respective axis of rotation 221.

The variable vane mechanism 200 may further include an actuator 250 (FIG. 2). The actuator 250 may be configured for driving rotation of the unison ring 226, the arms 220, and the vanes 218 relative to the support ring 212 and the pipe 206. The actuator 250 may include an electric motor in some embodiments. The actuator 250 may also include a crank arm that extend from the motor to one or more lead arms 235 (FIGS. 4 and 5) of the variable vane mechanism 200. The lead arm 235 may be attached at one end to the crank arm of the actuator 250 and may be attached at the opposite end to the unison ring 226. The actuator 250 may also be in communication with a processor of the ECU 150 (FIG. 1). Accordingly, the ECU 150 may generate and send control commands to the actuator 250 for selectively moving the unison ring 226 and the vanes 218. For example, the processor may receive one or more inputs (e.g., signals corresponding to the current engine speed, exhaust gas characteristics, etc.). The processor may determine a target position of the vanes 218 based on these inputs according to control logic, one or more algorithms. Then, the processor may generate control signals that prompt the actuator 250 to actuate the vanes 218 to the determined position.

Certain bearing surfaces for supporting rotation of the unison ring 226 will now be discussed in detail according to example embodiments. In some embodiments represented in FIG. 4, the support ring 212 may include a groove 213. The groove 213 may be arcuate and may extend continuously and annularly about the axis 103 in the circumferential direction. The groove 213 may be centered substantially on the axis 103. Also, the groove 213 may be disposed at the transition between the second face 211 and the outer radial periphery of the support ring 212. The internal surface(s) of the groove 213 may define a first bearing surface 215. The first bearing surface 215 may have a variety of shapes without departing from the scope of the present disclosure. For example, the first bearing surface 215 may include a radial portion 205 (i.e., an outer diameter surface) that faces outward radially from the axis 103, and an axial portion 207 that faces axially away from the pipe 206.

The variable vane mechanism 200 may further include one or more bearing members 234 (i.e., insert members). In the illustrated embodiment, there are three bearing members 234, which are spaced apart substantially evenly about the axis 103 in the circumferential direction 204. The bearing members 234 may include a respective second bearing surface 246 that abuts the first bearing surface 215 and that is supported for sliding movement on the first bearing surface 215 to support rotation of the unison ring 226 relative to the support ring 212.

As shown in FIG. 5, the bearing members 234 may be relatively small, rectangular tabs with a first side 236 and a second side 238. The first side 236 may be fixed to the first surface 230 of the unison ring 226, and the second side 238 may face away from the unison ring 226 toward the support ring 212 (FIGS. 3 and 4). The bearing members 234 may also be elongate between a first end 240 and a second end 242. The bearing member 234 may have a substantially straight axis between the first end 240 and the second end 242. The first end 240 and the second end 242 may be fixed to the unison ring 226. The bearing member 234 may include a raised portion 244 that is raised from the unison ring 226 in the axial direction. The raised portion 244 may include and define the second bearing surface 246. In some embodiments, the second bearing surface 246 may include a radial portion 252 that faces inwardly radially to abut against the radial portion 205 of the groove 213. The second bearing surface 246 may also include an axial portion 254 that faces axially to abut against the axial portion 207 of the groove 213. The second bearing surface 246 may also be chamfered between the radial portion 252 and the axial portion 254. Accordingly, the bearing members 234 may support the unison ring 226 for rotation about the axis 103. In some embodiments, the bearing members 234 may support radial loads between the unison ring 226 and the support ring 212 as well as support axial loads between the unison ring 226 and the support ring 212.

Figure 6:
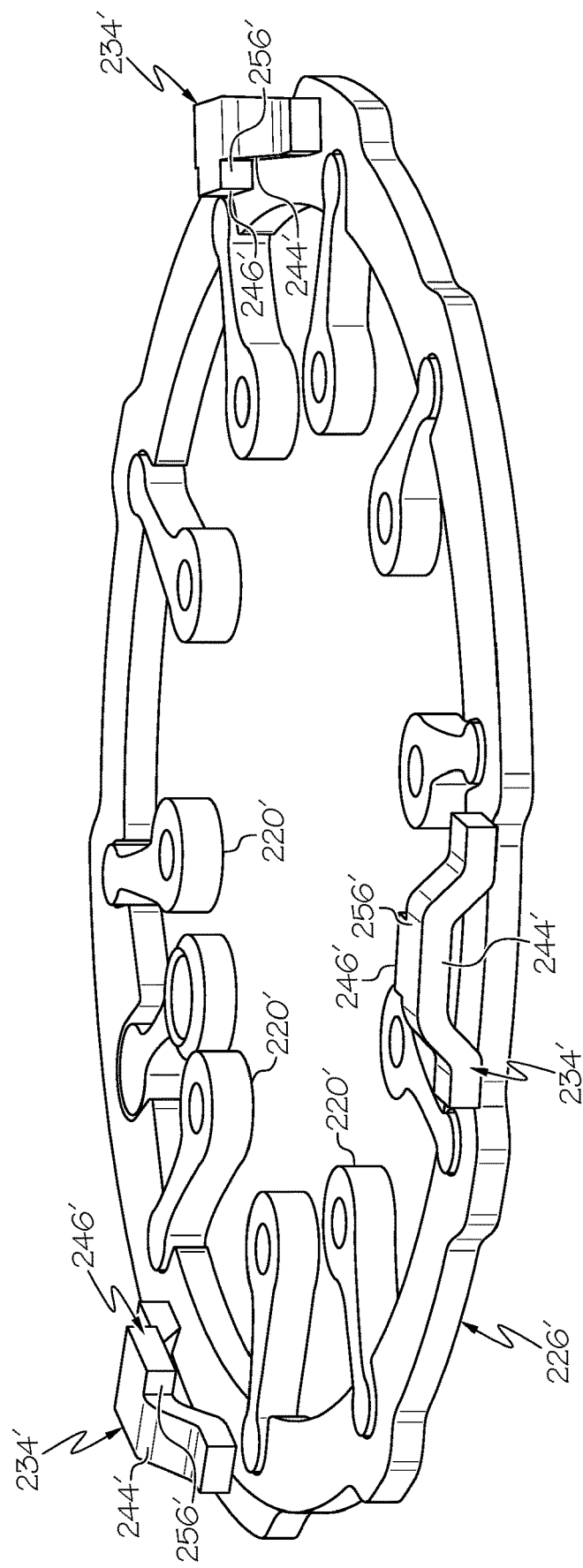
FIG. 6 is a perspective view of the unison ring, arms, and bearing members shown according to additional example embodiments of the present disclosure.

Referring to FIG. 6, the unison ring 226', the arms 220', and the bearing members 234' are shown according to additional embodiments. Other components of the variable vane mechanism 200 may be substantially similar to those discussed above. As shown, the bearing members 234' may be substantially similar to those of FIGS. 3-5, except that the bearing members 234' may include a radial projection 256'. The radial projection 256' may project radially inward from the raised portion 244'. The radial projection 256' may include the second bearing surface 246' of the bearing member 234'.

Referring now to FIG. 9, the unison ring 326 and the bearing members 334 are shown according to additional embodiments. Other components of the variable vane mechanism may be substantially similar to those discussed above. Components that correspond to those of the embodiments above are indicated by corresponding reference numbers increased by 100. As shown, the bearing members 334 may include an end 340 and a raised portion 344 that extends from the end 340. The raised portion 344 may be fixed to the unison ring 326 via a weldment 360, such that the raised portion 344 is spaced apart from the unison ring 326. As such, the raised portion 344 may be cantilevered above the unison ring 326. The raised portion 344 may include the radial projection 356, and the radial projection may include the second bearing surface 346.

Methods of manufacturing the variable vane mechanism 200 will now be discussed with reference to FIGS. 3-5, 7, and 8. It will be appreciated that the following discussion applies to the embodiments of FIGS. 6 and 9 and/or other embodiments of the variable vane mechanism as well. In some embodiments, manufacturing techniques of the present disclosure may allow the variable vane mechanism 200 to be produced with fewer parts (e.g., fewer pins, pads, rollers, etc.) compared with conventional mechanisms. However, the variable vane mechanism 200 may maintain high quality standards.

The unison ring 226, the bearing members 234, the support ring 212 and/or other components of the vane mechanism 200 may be constructed and assembled together according to the teachings of the present disclosure to provide various advantages. For example, the material qualities of the bearing members 234 and the second bearing surfaces 246 may be chosen to be especially complimentary to that of the support ring 212 and the first bearing surface 215 (e.g., for low friction, high wear resistance, etc.). Also, the material qualities of the unison ring 226, the arms 220, the posts 217, the vanes 218, etc. may be chosen for high strength, high temperature performance, etc.

In particular, the bearing members 234 and the unison ring 226 may have independent and different material characteristics from each other. For example, the bearing members 234 and the unison ring 226 may be made from different materials (different material types, different material grades, etc.). Furthermore, in some embodiments, the bearing members 234 and the unison ring 226 may have different surface coatings, different heat treatments, etc. Accordingly, the bearing members 234 may be made to compliment the nozzle ring 224. Likewise, the unison ring 226 and the arms 220 may be manufactured for prolonged operating life of the variable vane mechanism 200. Manufacturing costs for the variable vane mechanism 200 may be reduced overall due to the low part count and relatively simple, but yet, robust design.

In some embodiments, the support ring 212 may be constructed independently. In some embodiments, the support ring 212 may be formed via a stamping or machining operation to an intermediate form that does not include the groove 213. Then, in some embodiments, the groove 213 may be formed in the intermediate form of the support ring 212 via machining (e.g., on a cutting machine such as a lathe or a mill).

The bearing members 234 may be formed from the same material (i.e., formed from a common material) as the support ring 212. Accordingly, in some embodiments, where the support ring 212 is formed from 310 stainless steel, the bearing members 234 may be formed from 310 stainless steel. This ensures that the first bearing surface 215 and the second bearing surfaces 246 complement each other in terms of friction and/or wear resistance characteristics. In some embodiments, the bearing members 234 may be formed via a stamping operation, a machining operation, or other manufacturing technique.

The unison ring 226 may be formed independent of the bearing members 234 in some embodiments. The unison ring 226 may be stamped, machined, or formed using another manufacturing technique. The unison ring 226 may formed from a ferritic material in some embodiments, such as a stainless steel.

In some embodiments, the unison ring 226 may be made from a different material and/or a different material grade from the bearing members 234. In some embodiments, the material of the unison ring 226 may be chosen from a group consisting of American Iron and Steel Institute (AISI) 304, 309, 310, 316, 286, or 321, and the bearing members 234 may be chosen from a group consisting of PL23, Nitronic 60, Nimonic 80a, Nimonic 90, Haynes 25, or Inconel 718. In a specific example, the unison ring 226 may be made from AISI 316 and the bearing members 234 may be made of AISI 310. In another embodiment, the unison ring 226 may be made from AISI 321 and the bearing members 234 may be made of AISI 310. In a further embodiment, the unison ring 226 may be made from AISI 321 and the bearing members 234 may be made of AISI 316. Moreover, in an additional embodiment, the unison ring 226 may be made from AISI 310 and the bearing members 234 may be made of AISI 316. Furthermore, in an additional embodiment, the unison ring 226 may be made from AISI 310 and the bearing members 234 may be made of Haynes 25. In another embodiment, the unison ring 226 may be made from AISI 304 and the bearing members 234 may be made of AISI 316.

Moreover, the unison ring 226 may also be heat treated to have a heat treat coating. In some embodiments, the unison ring 226 may be subjected to a nitriding process. The nitriding process may be a known heat treating process that diffuses nitrogen into the outer surfaces of the unison ring 226 to create a case-hardened surface. A nitride coating may be formed as a result. The unison ring 226 is heat treated within a prepared atmosphere to thereby apply the nitride coating to the outer surfaces of the unison ring 226. In some embodiments, the nitride coating may have a thickness of approximately two millimeters (2 mm).

Furthermore, the arms 220 may be formed via stamping, machining, etc. The arms 220 may be nitrided as well, similar to the unison ring 226. As such, the nitride coating may increase strength for the surfaces of the unison ring 226 and the arms 220.

This nitriding of the unison ring 226 and the arms 220 may occur independent of the bearing members 234 and the support ring 212 such that the first bearing surface 215 and the second bearing surfaces 246 remain free of the nitride coating. In other words, the first and second bearing surfaces 215, 246 may have independent material characteristics from the unison ring 226 and arms 220 in that the first and second bearing surfaces 215, 246 may remain raw and/or uncoated compared to the heat-treat coated unison ring 226 and arms 220.

Once these parts are formed, and the unison ring 226 and arms 220 are heat treated, the bearing members 234 may be attached to the unison ring 226. In some embodiments, the bearing members 234 may be integrally attached to the unison ring 226. More specifically, in some embodiments, the bearing members 234 may be welded to the unison ring 226. Accordingly, the integral connection may prohibit subsequent removal of the bearing members 234 without damage to both. It will be appreciated, however, that in other embodiments, the bearing members 234 may be removably attached to the unison ring 226, for example, by fasteners, or other components.

Figure 7:
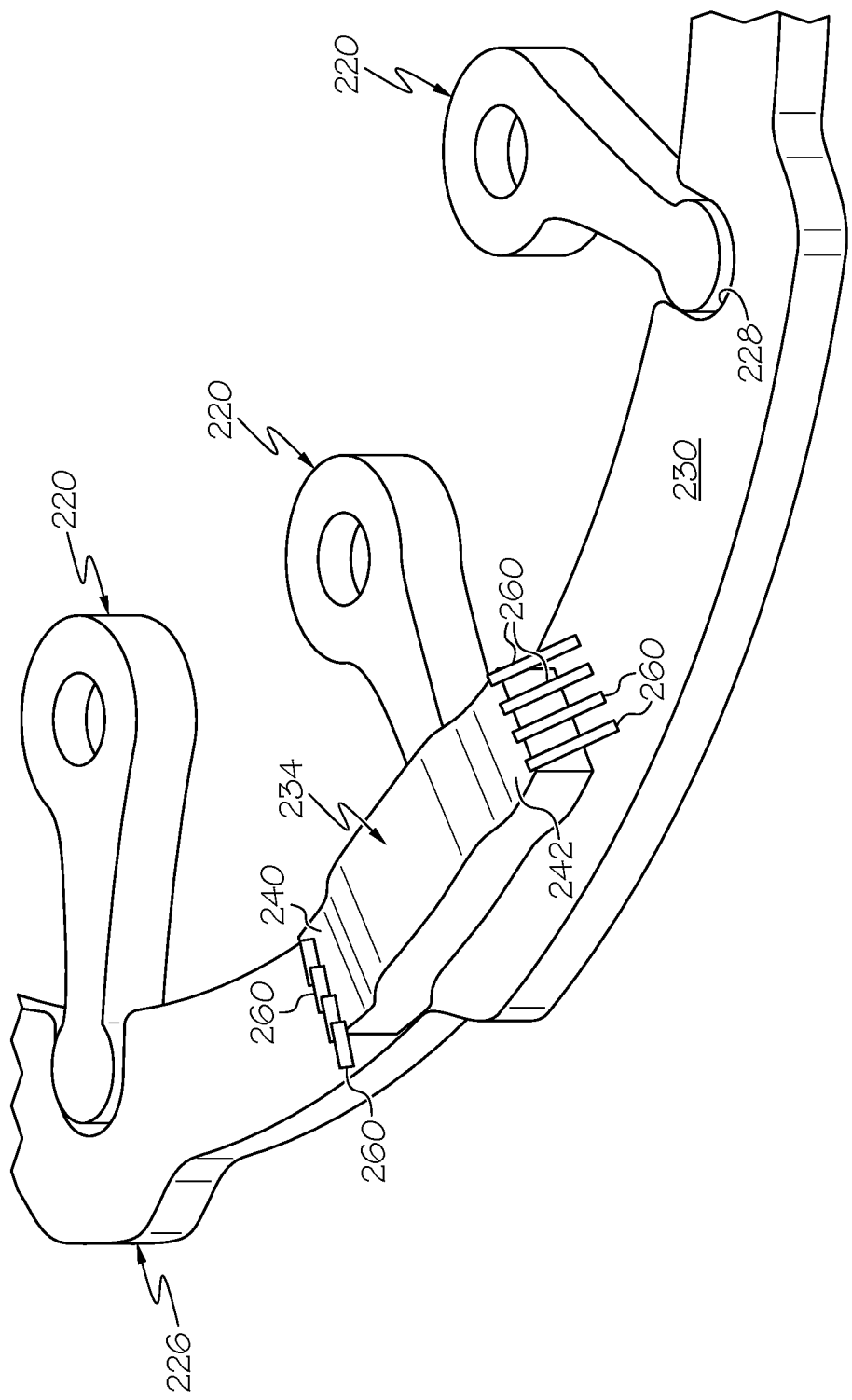
FIG. 7 is a perspective view of the unison ring, arms, and bearing members attached according to example embodiments.
Figure 8:
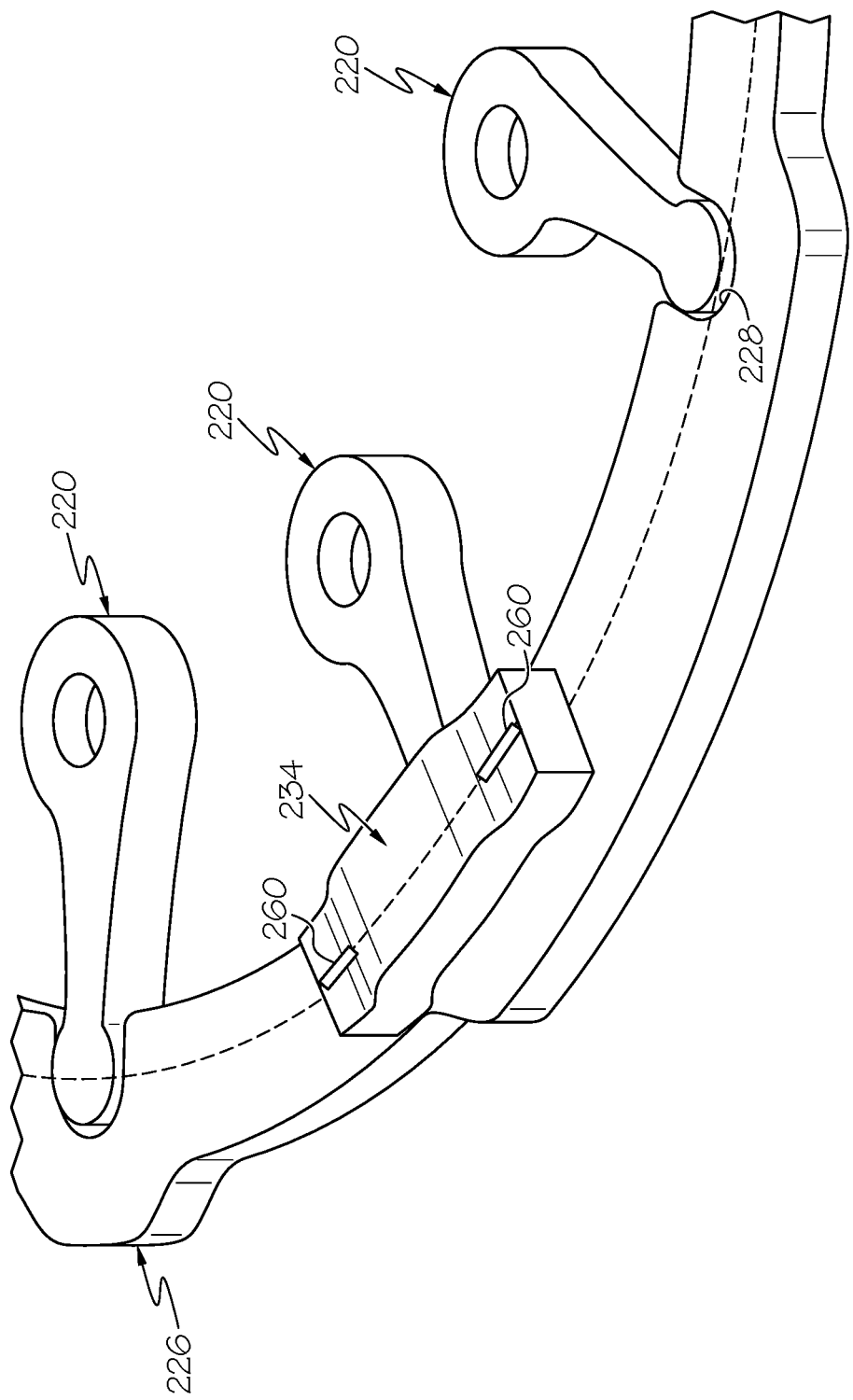
FIG. 8 is a perspective view of the unison ring, arms, and bearing members attached according to additional example embodiments.

As represented in FIGS. 7 and 8, the bearing members 234 may be welded to the unison ring 226 in various ways without departing from the scope of the present disclosure. In some embodiments represented in FIG. 7, the bearing members 234 may be TIG (Tungsten Inert Gas) welded or MIG (metal inert gas) welded to the unison ring 226 with one or more weldments 260 located between the first surface 230 and the first and second ends 240, 242 of the bearing members 234. As represented in FIG. 7, there may be a plurality of weldments 260 on both ends 240, 242. In additional embodiments represented in FIG. 8, the bearing members 234 may be laser welded to the unison ring 226 with one or more weldments 260 (e.g., spot-welds) extending through the first and second ends 240, 242 to the unison ring 226. As represented in FIG. 8, there by a single weldment 260 on each end 240, 242, and the weldments may be disposed approximately at the same radial distance from the axis 103.

Accordingly, the variable vane mechanism 200 may have a relatively simple design. The part count may be relatively low. Assembly may be completed efficiently as well. Furthermore, the unison ring 226 and the arms 220 may be constructed as high strength components due to the nitride coating. Also, the bearing members 234 and the support ring 212 may be complimentary to each other to reduce friction at the bearing surfaces and to increase wear resistance.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A turbocharger system comprising:
    a housing;
    a wheel configured to rotate within the housing;
    a variable vane mechanism configured to move between a first position and a second position to affect a gas stream relative to the wheel, the variable vane mechanism including:
        a support ring with a first bearing surface, the first bearing surface being arcuate;
        a continuous, one-piece unison ring that is supported for rotation about an axis of rotation relative to the support ring as the variable vane mechanism moves between the first position and the second position;
        a plurality of vanes that are operatively connected to the unison ring and configured to move substantially synchronously relative to the support ring as the unison ring rotates relative to the support ring to affect the gas stream; and
        at least one bearing member that is fixed to the unison ring and that includes a second bearing surface, the second bearing surface abutting the first bearing surface, the at least one bearing member supported for sliding movement on the first bearing surface to support rotation of the unison ring relative to the support ring, the bearing member abutting the support ring to support radial loads and axial loads between the unison ring and the support ring, the radial loads directed radially relative to the axis of rotation and the axial loads directed along the axis of rotation; and
        the unison ring and the at least one bearing member having independent material characteristics, and the first bearing surface and the second bearing surface formed of the same material.

2. The turbocharger system of claim 1, wherein the unison ring is coated with a heat treat coating; and
    wherein the first bearing surface and the second bearing surface are free of the heat treat coating.

3. The turbocharger system of claim 2, wherein the heat treat coating is a nitride coating.

4. The turbocharger system of claim 1, wherein the at least one bearing member includes at least three bearing members;
    wherein the unison ring and the at least three bearing members are configured to rotate about the axis of rotation relative to the support ring; and
    wherein the at least three bearing members are spaced apart substantially equally about the axis of rotation.

5. The turbocharger system of claim 1, wherein the bearing member is integrally attached to the unison ring.

6. The turbocharger system of claim 1, wherein the unison ring is made from a first material and the at least one bearing member is made from a second material that is different from the first material.

7. The turbocharger system of claim 1, wherein the variable vane mechanism further includes a plurality of arms;
    wherein ones of the plurality of arms operatively connect corresponding ones of the plurality of vanes to the unison ring; and
    wherein the plurality of vanes and the plurality of arms are configured to move substantially synchronously relative to the support ring as the variable vane mechanism moves between the first position and the second position.

8. The turbocharger system of claim 7, wherein the unison ring and the plurality of arms are coated with a nitride coating; and
wherein the first bearing surface and the second bearing surface are free of the nitride coating.

9. The turbocharger system of claim 7, wherein the unison ring includes a plurality of inner diameter notches; and
wherein ones of the plurality of inner diameter notches receive corresponding ones of the plurality of arms to interconnect the unison ring and the plurality of arms.

10. The turbocharger system of claim 1, wherein the bearing member and the support ring are constructed from a common material;
wherein the unison ring is coated with a heat treat coating; and
wherein the first bearing surface and the second bearing surface are free of the heat treat coating.

11. The turbocharger system of claim 1, wherein the first bearing surface defines a groove of the support ring; and
wherein the groove receives the bearing member.

12. The turbocharger system of claim 1, wherein the bearing member includes at least one end that is fixed to the unison ring;
wherein the bearing member includes a raised portion that is raised from the at least one end and the unison ring; and
wherein the raised portion includes the second bearing surface.

13. The turbocharger system of claim 1, wherein the bearing member includes at least one end that is fixed to the unison ring;
wherein the bearing member includes a raised portion that is raised from the unison ring, wherein the raised portion includes a radial projection that projects radially inward from the raised portion, and wherein the radial projection includes the second bearing surface.

14. A turbocharger system comprising:
a housing;
a wheel configured to rotate within the housing;
a variable vane mechanism configured to move between a first position and a second position to affect a gas stream relative to the wheel, the variable vane mechanism including:
a support ring with a first bearing surface, the first bearing surface being arcuate;
a unison ring that is supported for rotation relative to the support ring as the variable vane mechanism moves between the first position and the second position;
a plurality of vanes that are operatively connected to the unison ring and configured to move substantially synchronously relative to the support ring as the unison ring rotates relative to the support ring to affect the gas stream;
at least one bearing member that is fixed to the unison ring and that includes a second bearing surface, the second bearing surface abutting the first bearing surface and supported for sliding movement on the first bearing surface to support rotation of the unison ring relative to the support ring;
the unison ring and the at least one bearing member having independent material characteristics;
wherein the bearing member includes at least one end that is fixed to the unison ring;
wherein the bearing member includes a raised portion that is raised from the unison ring;
wherein the raised portion includes a radial projection that projects radially inward from the raised portion; and
wherein the radial projection includes the second bearing surface.

15. A method of manufacturing a variable vane mechanism of a turbocharger, the variable vane mechanism configured to move between a first position and a second position to affect a gas stream relative to a wheel of the turbocharger, the method comprising:
heat treating a continuous, one-piece unison ring of the variable vane mechanism to add a heat treat coating to the unison ring;
attaching the heat treated unison ring with an affixed bearing member to a support ring including abutting a first bearing surface of the support ring and a second bearing surface of the bearing member, the heat treated unison ring and the bearing member having independent material characteristics, the first bearing surface being annular and configured to support sliding movement of the second bearing surface on the first bearing surface, the unison ring supported for rotation about an axis of rotation relative to the support ring as the variable vane mechanism moves between the first position and the second position to substantially synchronously move a plurality of vanes of the variable vane mechanism, the bearing member abutting the support ring to support radial loads and axial loads between the unison ring and the support ring, the radial loads directed radially relative to the axis of rotation and the axial loads directed along the axis of rotation, the first bearing surface and the second bearing surface being free of the heat treat coating and formed of the same material.

16. The method of claim 15, further comprising machining a groove in the support ring to form the first bearing surface in the support ring.

17. The method of claim 15, wherein heat treating the unison ring includes nitriding the unison ring to add a nitride coating to the unison ring.

18. The method of claim 15, further comprising integrally attaching the bearing member to the unison ring.

19. The method of claim 18, wherein integrally attaching includes welding the bearing member to the unison ring.

20. The method of claim 15, further comprising fixing at least one end of the bearing member to the unison ring such that a raised portion of the bearing member is raised from the unison ring and such that a radial projection of the bearing member projects radially inward from the raised portion; and
wherein the radial projection includes the second bearing surface.

* * * * *